United States Patent [19]

Nakatani et al.

[11] Patent Number: 4,763,200
[45] Date of Patent: Aug. 9, 1988

[54] IMAGE OUTPUT APPARATUS

[75] Inventors: Munehiro Nakatani; Masamichi Sugiura, both of Toyokawa, Japan

[73] Assignee: Minolta Camera Kabushiki Kaisha, Osaka, Japan

[21] Appl. No.: 849,885

[22] Filed: Apr. 9, 1986

[30] Foreign Application Priority Data

Apr. 11, 1985 [JP] Japan .................................. 60-78042
Apr. 22, 1985 [JP] Japan .................................. 60-87262

[51] Int. Cl.⁴ ............................................. H04N 1/40
[52] U.S. Cl. ..................................... 358/282; 358/283; 358/285
[58] Field of Search ................. 358/285, 282, 283, 288

[56] References Cited

U.S. PATENT DOCUMENTS 4,672,461 6/1987 Yoshida ............................... 358/282

Primary Examiner—Edward L. Coles, Sr.
Attorney, Agent, or Firm—Price, Gess & Ubell

[57] ABSTRACT

An image scanning apparatus is provided by (1) a platen on which an original can be placed; (2) a scanning device for scanning the original, which includes a lens for projecting the image of the original on an imaging plane; (3) an image sensor for sensing the image projected on the imaging plane which consists of a plurality of elements arranged linearly along to the imaging plane; (4) a memory device for storing data sensed by the image sensor during a scan by the scanning device; and (5) an assembly for determining the real image area on the original based on the data stored in the memory device. To the above apparatus can be added an output control device for sending digital data of a real image area. A copier according to the present invention which can copy a manuscript, comprises: (1) the above-mentioned image scanning apparatus; (2) is also provided by the above by including an image forming device and (3) a control device for allowing the image forming device to form only the image in the image area. Also, a light controller for an image reader is provided by a standard pattern plate which has a standard pattern of a prescribed density; a light source driven by an electric power source of alternating current, illuminating the standard pattern plate and an original; and can compensate the ac ripples of the image signal.

16 Claims, 9 Drawing Sheets

IMAGE OUTPUT APPARATUS

BACKGROUND OF THE INVENTION

1. Field of the Invention

The present invention relates to an image output apparatus.

2. Description of the Prior Art

An image reader detects an original to be read with an image sensor and provides the image data to an output apparatus such as a printer wherein a hard copy on a paper can be obtained.

A copier scans an original to be copied, forms the image of the original on a photoconductor, and transfers the image to a paper as a hard copy.

An original should be placed on the platen in a normal position designated by a reference scale in both image output apparatus. It is a troublesome work to place an original accurately in the normal position. However, if the positioning is not accurate, the reproduced image gets out of position, or it can have certain defects.

A Japanese patent laid open publication No. 173959/1983 discloses an image output apparatus wherein an original can be placed in any place. However, this apparatus needs another operation to designate the area of the image.

When an original is illuminated or is exposed the intensity of the illumination should be stable at a pertinent level in order to get a hard copy at a predetermined density level. However, an exposure lamp deteriorates gradually as time passes. Further, an exposure lamp which is fed with alternating electric current has ripples in the intensity of illumination in correspondence with the frequency of the commercial electric source. Therefore, it is desirable to get a copy with a constant density level regardless of the change due to the above-mentioned factors. Especially in the present invention, which will be explained later, wherein the image area on an original is decided automatically from the change in the density in the original in order to avoid any troubles with the positioning of the original, the density of the original should be detected accurately for the decision of the image area regardless of the change in the intensity of illumination.

SUMMARY OF THE INVENTION

An object of the present invention is to provide an image scanning apparatus which can determine the real image area in an original placed on a platen.

Another object of the present invention is to provide an image reader wherein an original whose image should be read out can be placed in any position on a platen.

A further object of the present invention is to provide a copier wherein a material to be copied can be placed in any position on a platen.

A still further object of the present invention is to provide a light controller which can control the intensity of illumination of a lamp fed with an alternating electric current source.

An image scanning apparatus according to the present invention comprises: (1) a platen on which an original can be placed; (2) a scanning means for scanning the original, which includes a lens means for projecting the image of the original on an imaging plane; (3) an image sensor means for sensing the image projected on the imaging plane which consists of a plurality of elements arranged linearly relative to the imaging plane; (4) a memory means for storing data sensed by said image sensor means during a scan by the scanning means; and (5) a means for determining the real image area on the original based on the data stored in the memory means.

An image reader according to the present invention which can read an image in an original and can send the image as digital data, comprises: (1) a platen on which an original can be placed; (2) a scanning means for scanning the original, which includes a lens means for projecting the image of the original on an imaging plane; (3) an image sensor means for sensing the image projected on the imaging plane which consists of a plurality of elements arranged linearly along the imaging plane; (4) a memory means for storing data sensed by said image sensor means during a scan by the scanning means; (5) a means for determining the real image area on the original based on the data stored in the memory means; and (6) an output control means for sending the digital data of the real image area.

A copier according to the present invention which can copy a manuscript, comprises: (1) a platen on which an original can be placed; (2) a scanning means for scanning the original, which includes a lens means for projecting the image of the original on an imaging plane; (3) an image sensor means for sensing the image projected on the imaging plane which consists of a plurality of elements arranged linearly along the imaging plane; (4) a memory means for storing data sensed by said image sensor means during a scan by the scanning means; (5) a means for determining the real image area on the original based on the data stored in the memory means; (6) an image forming means for forming an image on the original on a paper; and (7) a control means for allowing the image forming means to form only the image in the image area.

A light controller for an image reader according to the present invention comprises (1) a standard pattern plate which has a standard pattern of a prescribed density (2) a light source driven by an electric power source of alternating current, illuminating the standard pattern plate and an original; (3) a photosensor means for detecting the intensity of light illuminated from the light source; (4) an image sensor means for detecting the light reflected from the standard pattern and the original; (5) a delay means for delaying the output of the photosensor in correspondence with delay of the output of the image sensor; (6) an analog-to-digital converter means for transforming an analog output signal of the image sensor means to a digital value; (7) a memory means for storing the output values of the analog-to-digital converter means; (8) a level setting means for sending a level voltage synchronously according to the output value of the analog-to-digital converter means synchronously to the output of the image sensor means when a standard pattern plate is illuminated by the light source; (9) an adder means for adding the output signal of the delay means and the output signal of the level setting means with a predetermined ratio, which adder means provides the sum signal to the input terminal for the standard voltage of the analog-to-digital conversion of the analog-to-digital converter means; and (10) a control means for changing the output signal of the level setting means until the output signal of the analog-to-digital converter means stored in the memory means attains a predetermined level and of keeping the output signal of the level setting means thereafter when the standard pattern plate is illuminated by the light source.

BRIEF DESCRIPTION OF THE DRAWINGS

The objects and the features of the invention may be understood with reference to the following detailed description of illustrative embodiments of the invention, taken together with the accompanying drawings.

DETAILED EXPLANATION OF EMBODIMENTS

Figure 1:
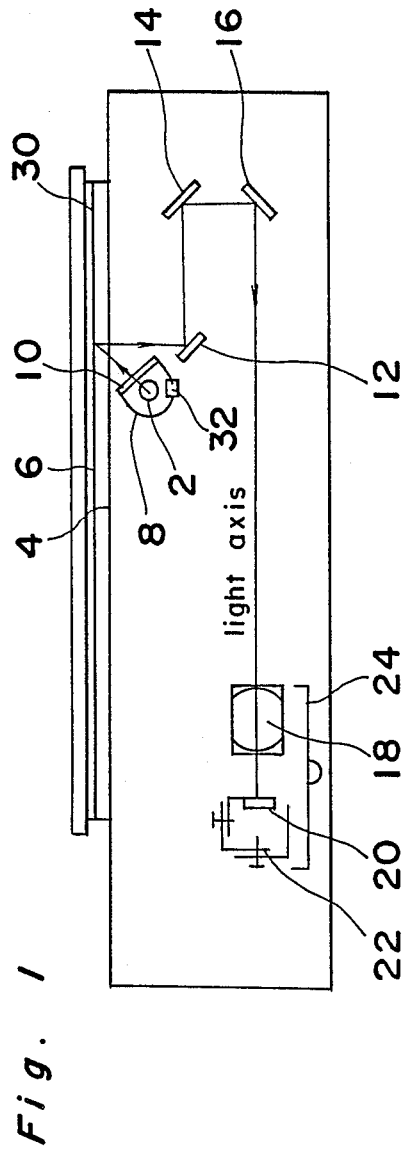
FIG. 1 is a sectional view of an image reader.

Referring now to the drawings, where like reference characters designate like or corresponding parts, embodiments of the present invention will be described in the following.

(a) Image reader

FIG. 1 shows a section of an image reader according to an embodiment of the present invention. A halogen lamp 2 which is a light source for exposure illuminates a document 6, or another material to be read, placed on a platen (document glass plate) 4. The halogen lamp 2 has a reflecting mirror 8 and a filter 10 which does not transmit infrared light.

The light reflected at the document 6 is reflected successively at a first mirror 12, at a second one 14 and at a third one 16, and it is transmitted through a lens 18 onto an image sensor 20 which comprises charge-coupled-devices of a one-dimensional array. A scan motor not shown can make both lamp 2 and mirrors 12, 14, 16 move backward and forward so that the ratio of the speed of the lamp 2 and the first mirror 12 to that of the other mirrors 14, 16 becomes 2:1. The scan motor is a pulse motor, which can be driven at the scan of each line of an image on a document.

An image sensor 20 is held by a supporter 22, and can be controlled as for the position and the angle. The supporter 22 and the lens 18 are set on a carriage 24.

The magnifying factor can be controlled by moving the carriage 24 along the direction of a light axis by means of a carrying mechanism not shown.

The focusing can be controlled by moving the image sensor 20 along the direction of light axis with a motor, not shown, fixed to the carriage 24.

A standard pattern plate 30 whereon a standard pattern of a predetermined density (say, white color) is drawn is provided on a platen 4 outside the region where a document can be placed. A photosensor 32 which detects the intensity of the illumination of the light source 2 is set near the light source 2.

(b) Printer

Figure 2:
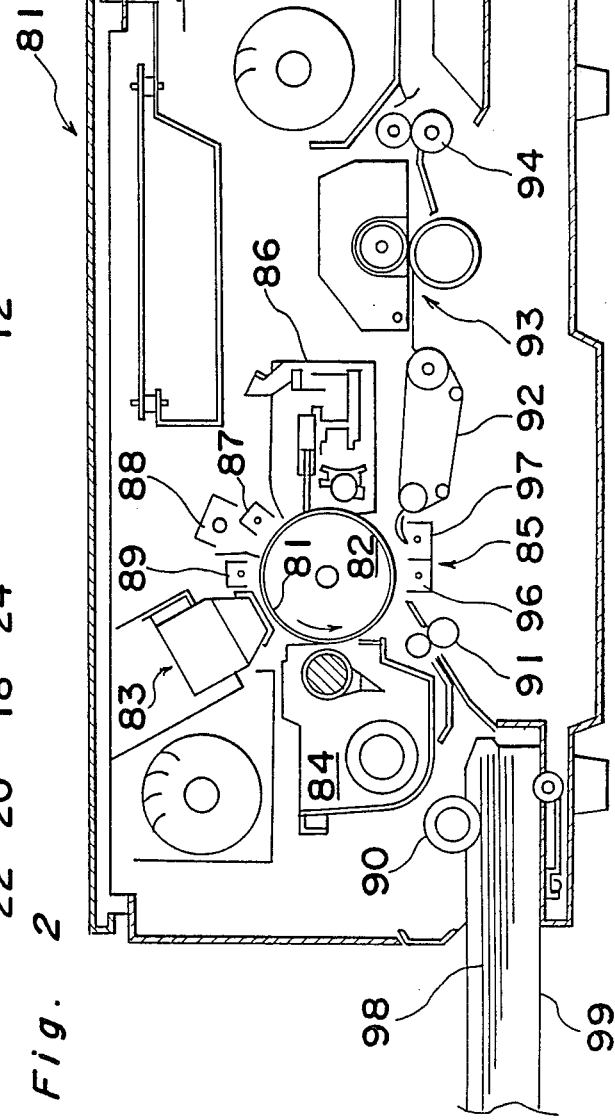
FIG. 2 is a sectional view of a printer.

FIG. 2 shows a section of an electrophotographic printer 60 which can be used as an output apparatus of the image reader shown in FIG. 1. This printer 60 makes use of an electrophotographic process. A photoconductor drum 82 has a photoconductor layer 81 on the surface. The drum 82 is supported so that it can rotate in the direction designated by an arrow. Around the photoconductor drum 82, a print head module 83, a developer unit 84, a charging unit 85 for transfer and separation, a cleaning unit 86, a subcharger 87 for the control of the polarity of surface charges, an eraser lamp 88 and a charger 89 are stationed successively.

The print head module 83 exposes the photoconductor drum 82 with light beams projected from an array of LEDs in correspondence to the image data received from an image reader, and forms a latent electrostatic image on the photoconductor layer 81. Then, a toner image is formed on the latent electrostatic image by the developing unit 84.

Papers 98 are stacked in a cassette 99, and they are fed to the drum 82 with the rotation of the feed roller 90 one by one from the uppermost one. A paper is stopped once at timing rollers 91. Then, it is carried onto the photoconductor drum 82 synchronously with the latent electrostatic image formed on the surface of the photoconductor 81 so that the toner image is transferred on the paper by the transfer charger 96. Next, the paper is separated from the photoconductor drum 82 by the separate charger 97, and it is carried with a conveyer belt 92 to a fixer 93 where the transferred image is fixed by heat rollers. Finally, it is carried off with rollers 94 out to a tray 95.

(c) Circuit for the detection of density

Figure 3:
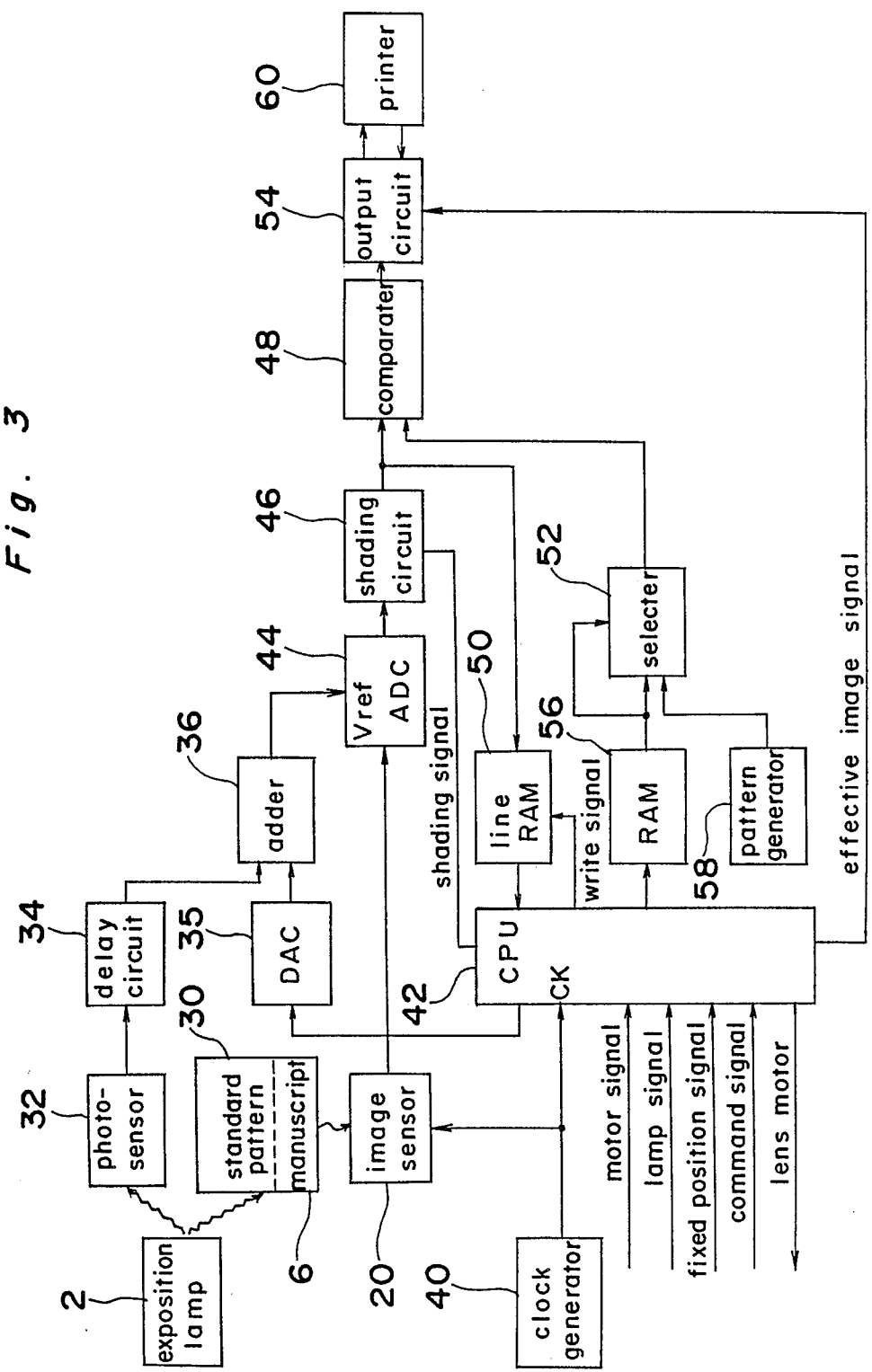
FIG. 3 is a block diagram of an image reader.

FIG. 3 shows a block diagram of a circuit which can detect the density of an image on a document. A clock generator 40 gives clock signals to a microprocessor (CPU) 42 and sample-hold (SH) signals to the image sensor 20. The image sensor 20 transforms a light signal into an electric signal, and an analog-to-digital (A/D) converter 44 transforms the analog output signal of the image sensor into a digital signal. A shading circuit 46 corrects the variation of the intensity of light in the direction of the main scan as well as the scattering of the characteristics of the elements of the image sensor 20, and the timing of the correction is given by the CPU 42. The output signal of the shading circuit 46 is sent to a comparater 48 and a line RAM 50. The image sensor 20 consists of 2048 CCD elements. They are aligned linearly to the direction of the main scan so that the light from a long and narrow line which crosses the platen 6 can be received and can be integrated in the elements at the same time during a period determined by SH signals. In the next period, the charges in the elements are transferred to registers in parallel and they are read out successively (this process is defined as the main scan). The data thus scanned are stored in the line RAM 50. In the same period, the scan system moves by one line in the direction perpendicular to that of the main scan (this process is defined as the subscan), and the light is again integrated in the elements. This procedure is repeated successively from the top to the bottom of the area of the platen 6.

The comparater 48 compares the image signal corrected by the shading circuit 46 with the signal selected by a selecter 52, and the resultant 1-bit output signal is sent to an output circuit 54. The output circuit 54 sends the bit image and the effective image signal (synchronizing signal) received from the CPU 42 to the printer 60.

A line RAM 50 stores the signals of one main scan corrected by the shading circuit 46 according to a write signal received from the CPU 42. The CPU 42 gets the image data of one scan with access to the line RAM 50. Attributes stored in a RAM 56 includes an attribute of binarization or dither which has been determined by the CPU 42 in a prescan from the data written in the line RAM 50. The attribute data are used by a selecter 52 at the transfer (or main scan) of the image signal in a main scan.

A pattern generator 58 generates a threshold value when the attribute is dither, and the threshold value is generated from a matrix (m x n). The selecter 52 selects a threshold data from both attribute data and the threshold data and sends it to the comparator 48. That is, when the attribute is dither, the selecter 52 sends the data received from the pattern generator 58 to the comparater 48, while when the attribute is binarization it sends a threshold data received from the RAM 56. The CPU 42 regulates the whole circuit based on the above-mentioned signals, the motor signal, the lamp signal and the fixed position signal.

The delay circuit 34 delays the ac part of the output signal of the photosensor 32 by a predetermined time (that is, the read time of one line) $t_s$. When the intensity of the light of the exposure lamp 2 is controlled, the density of the standard pattern of the plate 30 detected by the image sensor 20 is written in the line RAM 50. The CPU 42 sends to a digital-to-analog (D/A) converter 35 the signal of the intensity level which corresponds to the density of the standard pattern of the plate 30 stored in the line RAM 50. An adder 36 adds the output signals of both D/A converter 35 and delay circuit 34, and sends the sum to the reference voltage input terminal $V_{ref}$ of the A/D converter 44.

Figure 4:
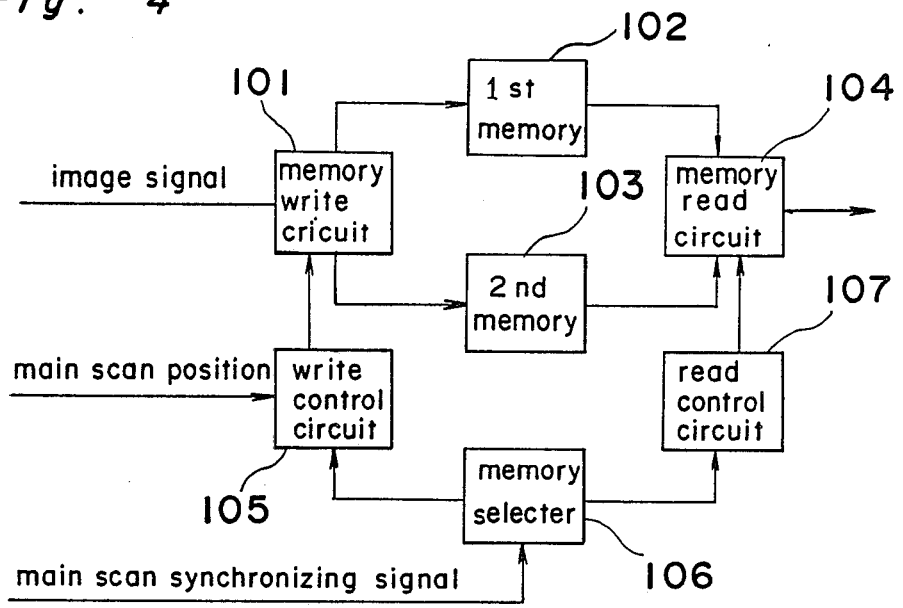
FIG. 4 is a block diagram of an output circuit of an image reader.

FIG. 4 shows a block diagram of the output circuit 54. An image signal sent from the comparater 48 is written in a first memory 102 or a second memory 103 by a memory write circuit 101. The first and second memories 102, 103 are used for the store and the read of image signals. A memory read circuit 104 reads an image signal from the first or second image signal from the first or second memory 102, 103 and sends it to the printer 60.

The read and write processes are controlled so that the second memory 103 is read while the first memory 102 is written and the first memory 102 is read while the second memory 103 is written. A write control circuit 105 selects a memory to be written and controls the address of the memory based on the main scan position signal of a document send from the CPU 42. In this embodiment, an image signal is controlled to be written in a memory while the main scan position signal is fed. Therefore, the discrepancy of the position in the direction of the main scan of a document can be corrected by the interposition of the memories 102, 103. A read control circuit 107 selects a memory to be read and provides the address of the memory. A memory select circuit 106 designates a memory to be written and a memory to be read for the write control circuit 105 and the read control circuit 107, respectively, in accordance with a main scan synchronizing signal (effective image signal).

Figure 5:
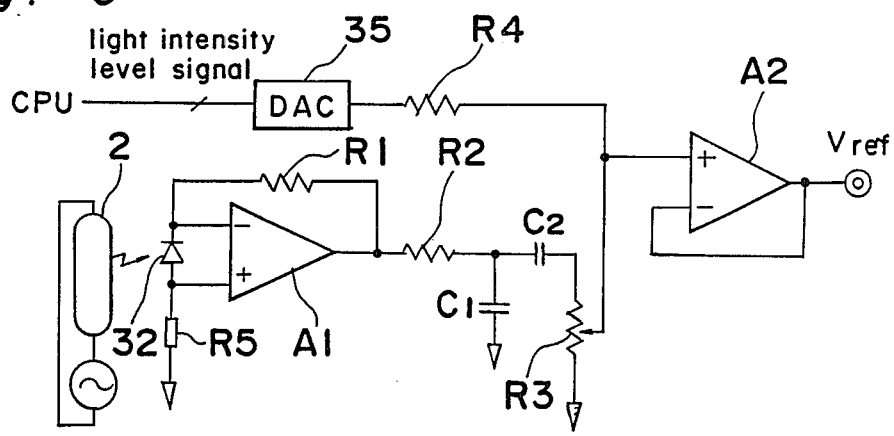
FIG. 5 is a circuit diagram of a delay circuit and an adder circuit of an image reader.

FIG. 5 shows the delay circuit 34 and the adder 36. A photodiode as the photosensor 32 generates a voltage which corresponds with the intensity of the light received from a halogen lamp 2 driven by a power source of alternating current. The voltage is provided between the plus input terminal and the minus one of an operational amplifier A1. The plus input terminal is connected to the ground via a resister R5. The minus input terminal and the output terminal of the operational amplifier A1 are connected to each other via a resistor R1. The output terminal is also connected to capacitors C1, C2. The capacitors C1 and C2 are connected to the ground directly and via a resistor R3, respectively.

In this circuit, the output voltage of the operational amplifier A1 is just the voltage of the photosensor 32. The capacitor C1 is used to delay the output signal of the operational amplifier A1. A delay device of different kinds can be used instead of the capacitor C1. The capacitor C2 is used to transmit only ac components of the output signal.

On the other hand, the output voltage of the D/A converter 35 is connected via a resistor R4 both to the variable terminal of the resister R3 and to the plus input terminal of an operational amplifier A2. The minus input terminal and the output terminal of the operational amplifier A2 are connected to each other. The output voltage of the operational amplifier A2 gives the reference voltage $V_{ref}$ of the A/D converter 44.

In this circuit, the ac component of the output voltage of the photosensor 32 flows through the resister R3, while the output voltage of the D/A converter 35 which is proportional to the output signal of the image sensor 20 flows through the resistor R4 and a part of the resister R3. Therefore, both output voltages are summed in proportion to a predetermined ratio which can be controlled by the variable terminal of the variable resistor R3.

(d) Control of the exposure

The intensity of the illumination of the exposure lamp 2 is controlled at each read of a document, as will be explained later, so that an image signal can be read with a stable density level even when the lamp 2 is driven by a commercial ac electric power source.

Figure 6:
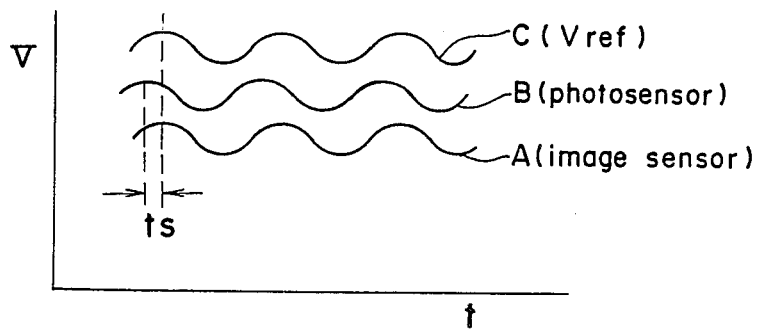
FIG. 6 is a graph of the voltage of an image sensor, that of a photosensor and $V_{ref}$.

At a read of a document, the standard pattern 30 of a predetermined density (for example, white) is illuminated first by the lamp 2 driven by the commercial ac power source, and analog output signals in accordance with the density are provided by the elements of the image sensor 20. The obtained analog signals have ripples of the same frequency as that of the power source, as shown as A in FIG. 6. The analog signals are converted to digital values of a plurality of bits by the A/D converter 44 with reference to the signal $V_{ref}$ mentioned above. The digital signals are written in the line RAM 50 after corrected for the shading by the shading circuit 46. The CPU 42 sends to the D/A converter 35 an initial value of the intensity level which is proportional to an average value of the data stored in the line RAM 50, and the D/A converter 35 converts it to an analog voltage. On the other hand, the output signal of the photosensor 32 which detects the intensity of the light from the exposure lamp 2 also has ac ripples of the frequency of the power source as shown as B in FIG. 6. Note that the phase of the output signal of the image sensor is retarded by a read time $t_s$ of a scan of a line of the image sensor. The ac components of the output signal of the photosensor 32 can be synchronized by the delay circuit 34 with that of the image sensor 20. The output voltage of the D/A converter 35 and that of the delay circuit delayed by $t_s$ are summed in the adder 36 with a predetermined ratio, and the resultant output voltage of the adder 36 is used as the refernce voltage $V_{ref}$ of the A/D converter 44. Thus, as shown as C in FIG. 6, the reference voltage $V_{ref}$ has the same phase of ac components as that of the image sensor 20.

By using the $V_{ref}$, the output voltages of the image sensor 20 at the next output period are again converted to digital values by the A/D converter 44, and the digital values are written in the line RAM 50 similarly. The CPU 42 decides whether an average value of the detected values stored in the line RAM 50 is at the predetermined level or not. If the decision is yes, the control of the intensity of light completes, and an ordinary read of a document starts.

If the decision is no, the CPU 42 varies the light intensity level signal by a predetermined value so that the reference voltage $V_{ref}$ of the A/D converter 44 is shifted. Next, the output voltages of the image sensor 20 are converted to digital values, which are written in the line RAM 50. The CPU 42 decides again whether the average value of the detected values stored in the line RAM 50 is at the predetermined level or not. If the decision is yes, the control of the light intensity completes. On the contrary, if the decision is no, the light intensity level signal is again varied, and the reference voltage $V_{ref}$ is shifted. The intensity of light is controlled until the data written in the line RAM 50 attains the predetermined value.

After the control of the intensity of light completes, a document is read. Thus, output signals of the image sensor 20 can be corrected with delayed output signals of the photosensor 32 when the exposure lamp 2 is driven at the frequency of the commercial power source. Therefore, the image signal can be stabilized with respect to time. The effect of the change in color temperature can also be prevented. Further, the cost of the total exposure source can be saved by using a lamp which can be driven by the commercial power source.

(e) Read of image in a document

Figure 7:
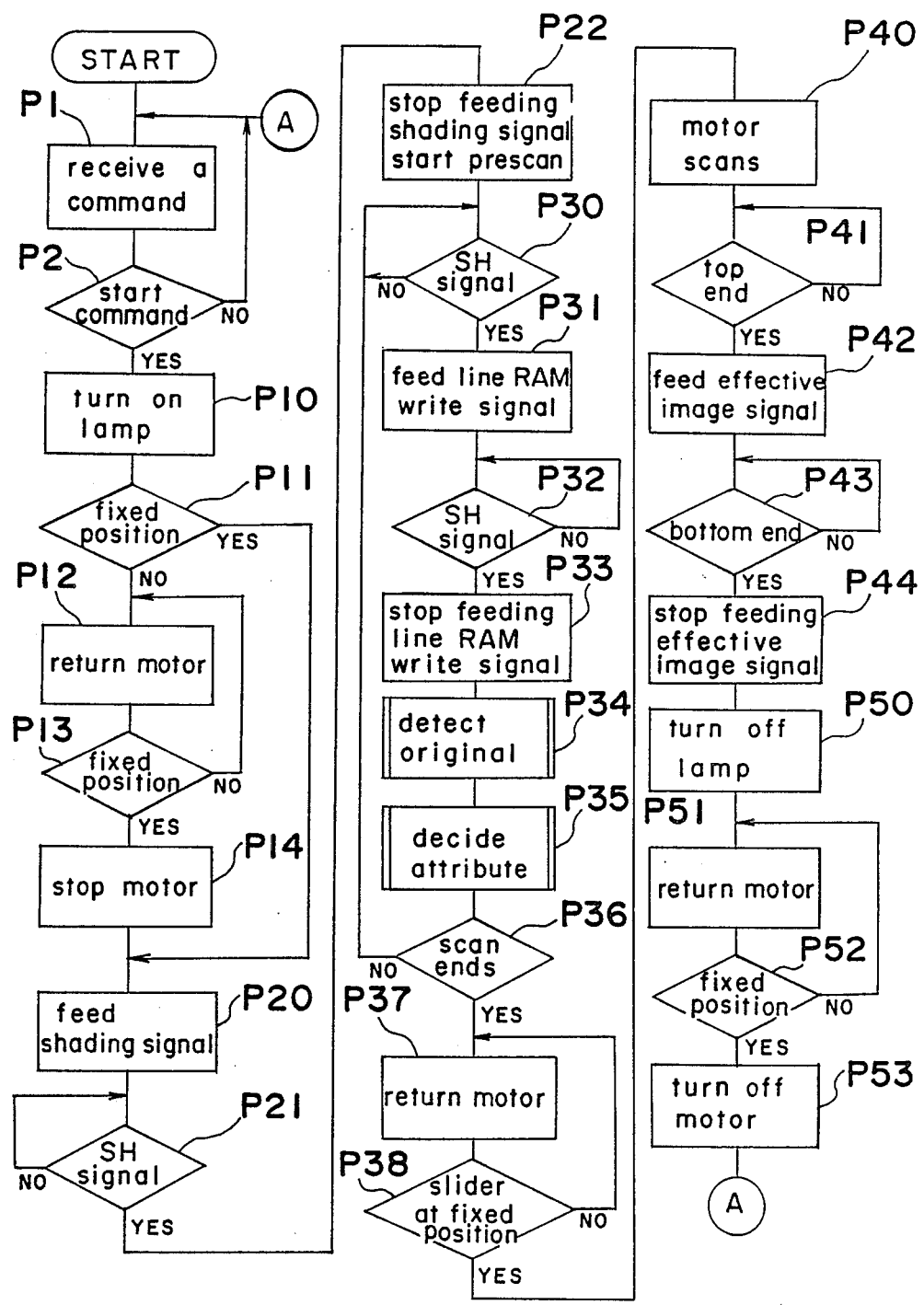
FIG. 7 is a flowchart for the reading of a manuscript.

FIG. 7 shows a flowchart of the sensing of image. First, a command signal is received (step P1). Next, it is decided whether the command signal is the start command or not (Step P2). If the start command is received a following scan action starts, wherein the magnifying power and other parameters of the scan system have been set according to operating conditions.

Then, the exposure lamp 2 is turned on (step P10). Next, it is decided whether the scan system (slider) returns at a predetermined fixed position or not (step P11). If the decision is yes, the program goes to step P20. If not, the scan motor is driven so that the scan system is moved in the return direction to the fixed position (step P12) until the scan system returns at the fixed position (step P13). Then, the scan motor is stopped (step P14).

Next, the shading process starts. Because the slider locates at the reference level, the shading signal is fed (step P20). After a sample-hold (SH) signal as the synchronizing signal of the output of the image sensor 20 is received (step P21), the shading signal is stopped being fed, and a prescan for the detection of a document and for the decision of the attribute starts (step P22).

After an SH signal is received (step P30), the output voltages of the image sensor 20 corrected for the shading are written in the line RAM 50 (step P31). Next, after an SH signal is received (step P32), the write signal of the line RAM 50 is stopped being fed (step P33). Then, the position of a document is detected from the data written in the line RAM 50(step P34), as will be explained later in detail. Next, it is decided whether the attribute of the data processing is binarization or dither from the data written in the line RAM 50, and the results of the decision are written in the selecter 52 (step P35), as will be explained later in detail. Then, it is decided whether the scan ends or not (step P36). If the decision is yes, the motor is driven in the return direction (step P37) until the slider returns to the fixed position (step P38).

Then, a normal scan starts. First the scan motor is driven in the direction of subscan by a predetermined step, and a scan for the output of the data starts (step P40).

The margin at the upper side of the paper has been calculated from the size of the detected image on the document, the size of the paper, and the magnifying factor so that the document area locates just at the center of the paper. The calculated value of the margin or the position of the upper end of the image on the document is used for the generation of the subscan synchronizing signal for the feed of a paper in the printer 60. The subscan synchronizing signal is sent after the delay of a calculated period according to the margin after the start of the scan of step P40. Next, the scan of the scan motor proceeds until it reaches the top position of the image which has been determined at the prescan (step P41). Then, the output circuit 54 is made effective. After this, the read-out of the image proceeds successively till it is decided that the scan comes to the bottom position of the image area in the document (step P43).

Then, the output signal of the output circuit 54 is stopped being fed (step P44), and the exposure lamp 2 is turned off (step P50). The scan motor is returned (step P51) until the slider reaches the fixed position (step P52), and the motor is also turned off (step P53). After this, the flow returns to step P1 of the main routine, and the next start command is waited.

(f) Detection of image area

Figure 8A:
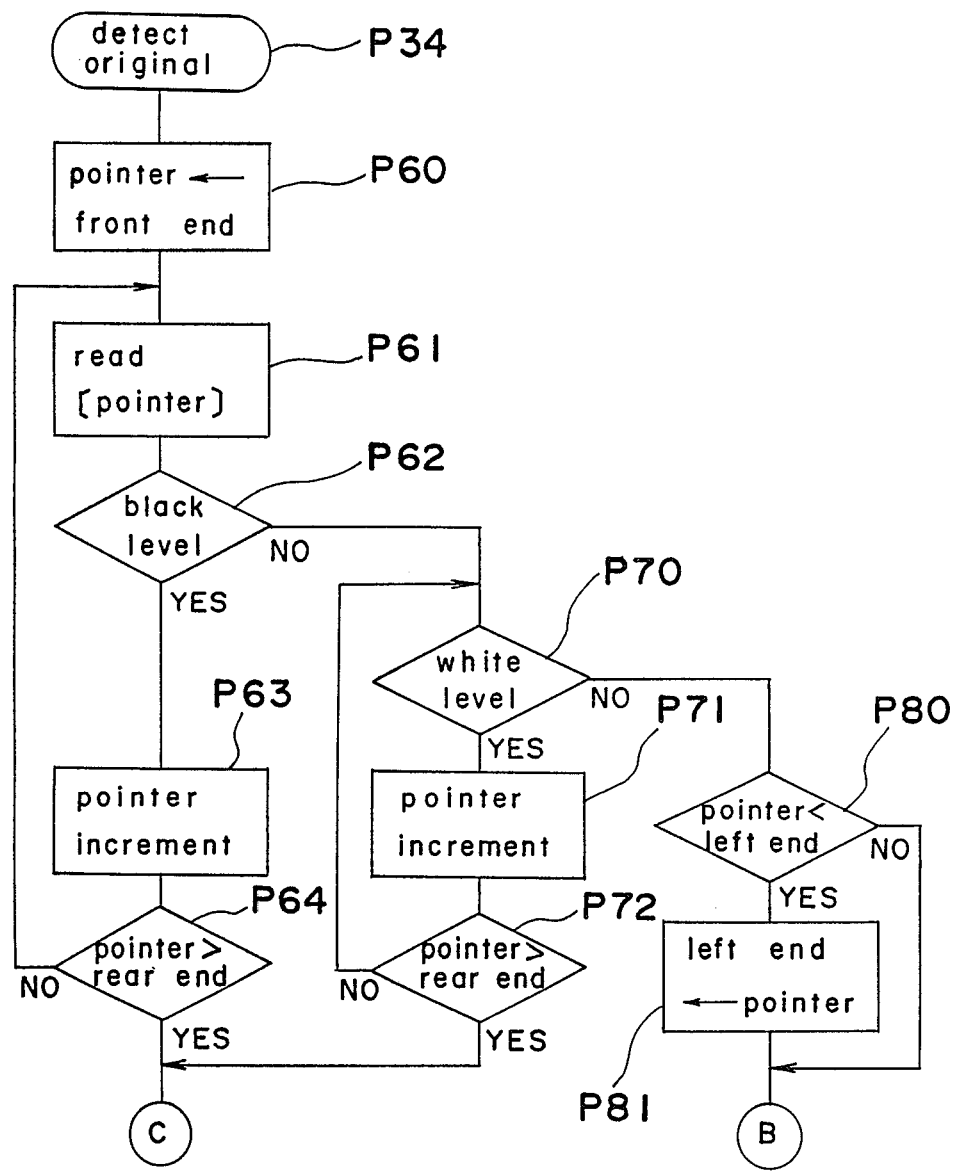
FIGS. 8(a),(b) are flowcharts of the detection of a document.
Figure 8B:
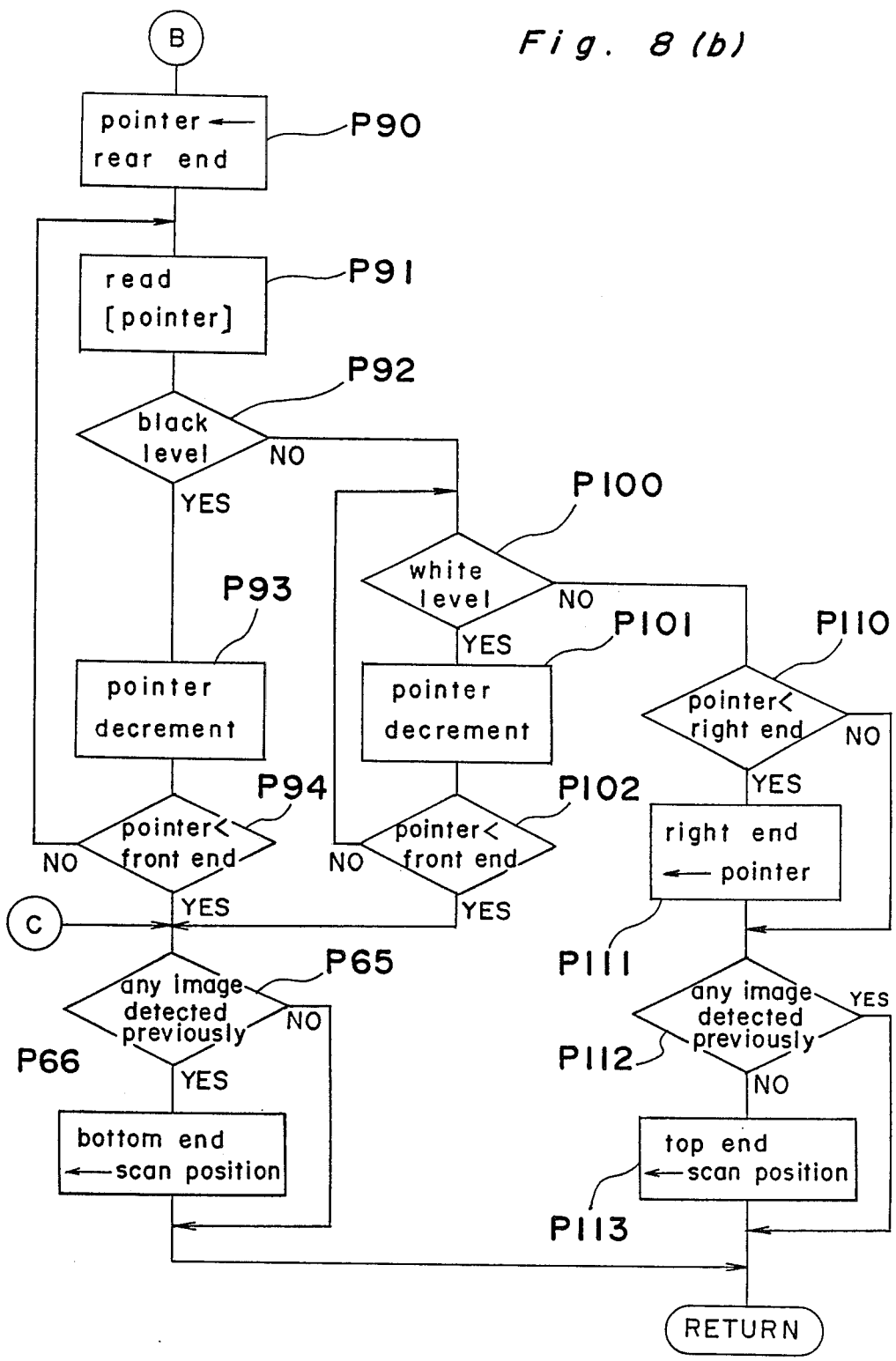
Figure 9A:
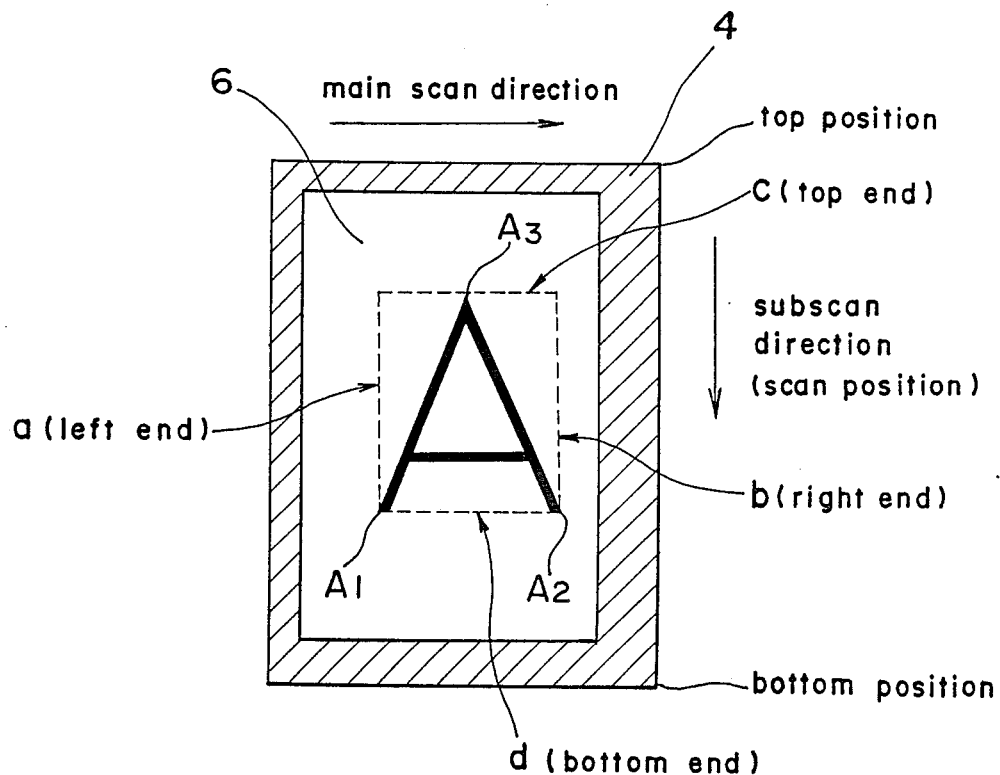
FIGS. 9(a),(b) are an example of a document placed on a platen.

FIG. 8 shows a flowchart of the subroutine of the detection of the position of the image area of characters and figures in a document (step P34) on the basis of the data stored in the line RAM 50 in the prescan, with reference to an example of a document 6 shown in FIG. 9(a) which includes a large character "A" of a Roman letter.

FIG. 9(a) is a bottom plan view of the document 6 placed on the platen 4, wherein the document 6 is positioned not accurately along the reference scale of the platen 6, but moderately around the center of the platen. The document cover whose inner face to touch the document 6 and is white can be kept open in the detection process. An area around the document 6 displayed by the hatch in FIG. 8 does not reflect the light from the lamp 2 to the image sensor 20 so that the area is black for the image sensor 20. The image area in the document will be detected as the smallest rectangle which surrounds the image of characters and figures, that is, an area displayed by broken lines. Broken lines "a" (left end) and "b" (right end) are lines which touch the left most point (A1) and the right most point (A2) of the image (letter A), respectively. On the other hand, broken lines "c" (top end) and "d" (bottom end) are lines which touches the top point (A3) and the bottom points (A1 and A2), respectively. The boundaries "a" to "d" which fix the image area are determined by evaluating the data of the elements of CCD 20 which array in the direction of main scan per each line. Thus, the boundaries "a", "b" and "c", "d" are perpendicular and parallel to the direction of main scan, respectively. The values which indicate the boundaries "a" to "d" are detected by the flowchart shown in FIGS. 8(a), (b).

Figure 9B:
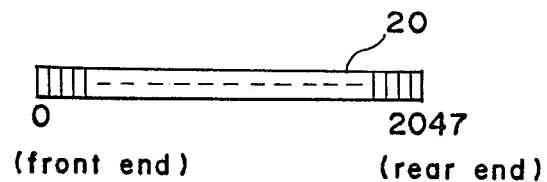

The image sensor 20 consists of 2048 CCD elements. They are aligned linearly relative to the direction of the main scan so that the light from a long and narrow line, which crosses the platen 6 can be received as shown in FIG. 9(b), can be integrated in the elements at the same time during a period determined by SH signals. In the period, the charges in the elements are transferred to registers in parallel and they are read out successively. The data thus scanned are stored in the line RAM 50, and they are processed as shown by the flowchart in FIG. 8. In the same period, the scan system moves by one line in the direction of subscan, and the light is again integrated in the elements. This procedure is repeated successively from the top position, the top of the area of the platen 6, to the bottom position, the bottom of the area of the platen 6. At the initialization step of the main flow not shown in FIG. 7, a register which indicates the position of the rear end is set to have a value "2047" which means the element at the rear end of the image sensor 20, while a register which indicates the position of the front end is set to have a value "0" which means the element at the front end of the image sensor 20.

Before this subroutine (step P34) is called, the data obtained in a main scan is stored in the line RAM 50. In the flow shown in FIG. 8, a pointer is first set to have a value "0" which corresponds to the front end of the image sensor 20 (step P60). The pointer is used in order to indicate the position of the element of the image sensor 20 in the data stored in the line RAM 50. Next, the data of the element which is indicated by the pointer is read out (step P61). It is decided whether the data is the black level or not (step P62). If the decision is yes, the data does not include any content of the document so that the pointer is renewed to the next position or the pointer address is increased (step P63). According to the increment of the pointer, the element whose data should be read out moves from left to right. Next, it is decided whether the pointer goes over the rear end of the image sensor 20 or not (step P64). If the decision is no, the program returns to step P61; otherwise it is decided that the content of the document is not detected in the present line (or main scan).

Then, it is decided whether the content of the document has been detected in previous lines (step P65). If the decision is yes, the present scan position is set as the bottom end of the image area (step P66). Then, the program returns to the main flow.

If it is decided in step P62 that the data of the elements designated by the pointer is not the black level, it is decided next whether it is the white level or not (step P70). If the decision is yes, the pointer is renewed to the next position or the pointer address is increased (step P71). Next, it is decided whether the pointer goes over the rear end of the image sensor 20 or not (step P72). If the decision is no, the program returns to step P70; otherwise, the black level is not detected after the white level is detected, and it is decided that any content of the document is not included in the present line, and the program proceeds to step P65.

If it is decided in step P70 that the data is not the black level or if a change to the black level is detected, it is decided next whether the pointer is smaller or not than the left end of the image area which have been detected in the previous lines (step P80). If the decision is yes, the present position of the pointer, that is, the position where the black level is detected again is set as the left end hereinafter. Thus, the left end is detected.

Next, the right end will be detected. First, the pointer is set at the position which corresponds to the rear end of the image sensor 20 (step P90). Then, the data of the element designated by the pointer is read out (step P91), and it is decided whether the data is the black level or not (step P92). If the decision is yes, the content of the document is not detected so that the pointer is renewed to the next position or the pointer address is decreased (step P93). Next, it is decided whether the pointer is smaller than the front end of the image sensor 20 (step P94). If the decision is no, the program returns to step P91; otherwise, it is decided that the content of the document is not detected in the present line, and the program proceeds to step P65.

If it is decided in step P92 that the data of the element designated by the pointer is not the black level, it is decided next whether the data is the white level or not (step P100). If the decision is yes, the pointer is renewed to the next position or the pointer address is decreased (step P101). Next, it is decided whether the pointer is smaller than the front end of the image sensor 20 or not (step P102). If the decision is no, the program returns to step P100; otherwise, it is decided that any content of the document is not detected in the present line, and the program proceeds to step P65.

If it is decided in step P100 that the data is not the white level or that the black level is detected again, it is decided next whether the pointer is larger than the right end or not (step P110). If the decision is yes, the right end is set as the pointer. Thus, the right end of the image area is obtained.

Next, it is decided whether the content of the document has been detected in previous lines before the present line (step P112). If any content of the document has not been detected previously, the present subscan position is set as the top end of the image area (step P113). Then, the program returns to the main routine shown in FIG. 7.

To sum up, the image area on a document is determined from the positions of the elements in the image sensor at which the data of the detection changes from the white level to the black level in the directions from the outside to the inside of the document.

Therefore, the image on a document can be detected even if the document is not located along the standard reference scale. Further, even if the document cover is kept open, the data of the black level detected around a document are neglected because the image area will be detected after the white level is detected once.

The image on a document will be reproduced in a paper which has a size in correspondence to the detected effective image area.

(g) Decision of the attribute

Figure 10:
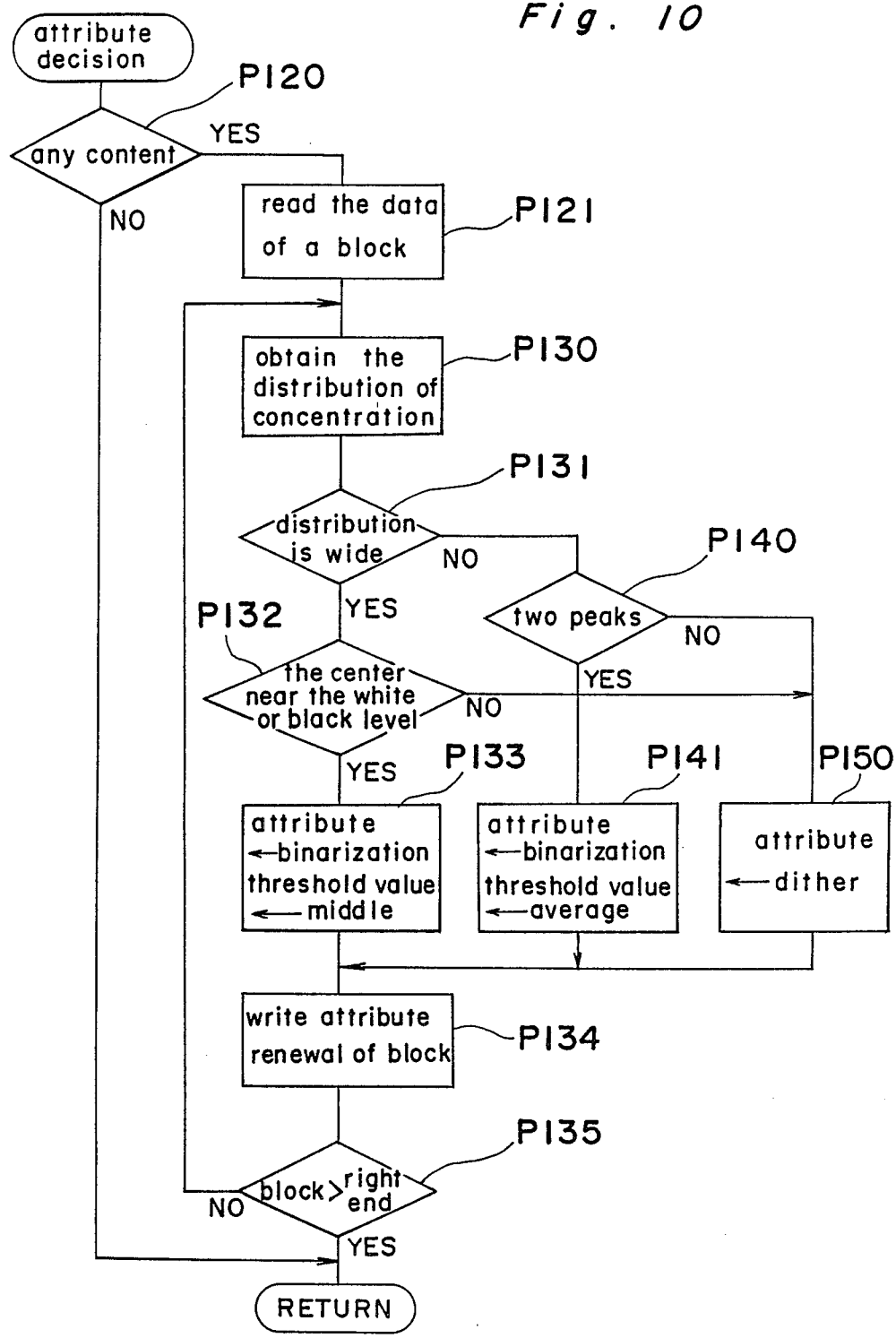
FIG. 10 is a flowchart of the decision of the attribute of image.

The image processing of the density of a document in the present embodiment makes use of either of a binarization process appropriate for characters or a dither process appropriate for half-tone images. In step P35 of attribute decision one of both processes is selected from the data stored in the line RAM 50 by using the flowchart displayed in FIG. 10; the image area is divided in blocks of a predetermined size (say, 10×10 mm) and the attribute of the image processing is decided on each block.

First, it is decided whether the document detected in step P34 includes any content or not (step P20). If the decision is no, the program returns to the mainflow at once. If the document includes any content, the data of a block at the top of the left side is read (step P121), and the attribute of the block is decided as follows.

First, the distribution of the density in the block is obtained (step P130). Next, it is decided whether the distribution of the density is wider than a predetermined value (step P131). If the decision is no, it is decided next whether the center of the density is either near the white level or near the black level (step P132). If the decision is yes, the attribute is set as binarization, and the threshold level is set at the center of the black and white levels (step P133). Then, the attribute and the threshold level thus selected are written in the RAM 56, and a next block is designated in the order of main scan direction (step P134). Next, it is decided whether the new block passes over the right end (step P135). If the decision is no, the program returns to step P130, and continues the attribute decision. If the new block passes over the right end, the program returns to the main flow.

If it is decided in step P131 that the distribution of the density is wider, it is decided next whether the number of density peaks is two or not (step P140). If the decision is yes, the attribute is set as binarization and the threshold value is set as the average of the density at the two peaks (step P141). Then, the program proceeds to step P134.

If the distribution of the density is narrower (step P131) and if the number of the density peaks is not two (step P140), the attribute is set as dither (step P150). Further, if the distribution of the density is wider (step P131) and if the center of density is either near the white level or near the black level (step P132), the attribute is set as dither (step P150). Then, the program proceeds to step P134.

Next, the attribute decided as mentioned above is selected by the selecter 52, and the density is sent to the comparator 48 by using the attribute. Then, a next block is designated (step P134).

Next, it is decided whether the new block passes over the right end (step P135). If the decision is yes, the program returns to the main flow; otherwise, the program returns to step P130 and the attribute of the new block will be determined.

(h) Control of printer

Figure 11:
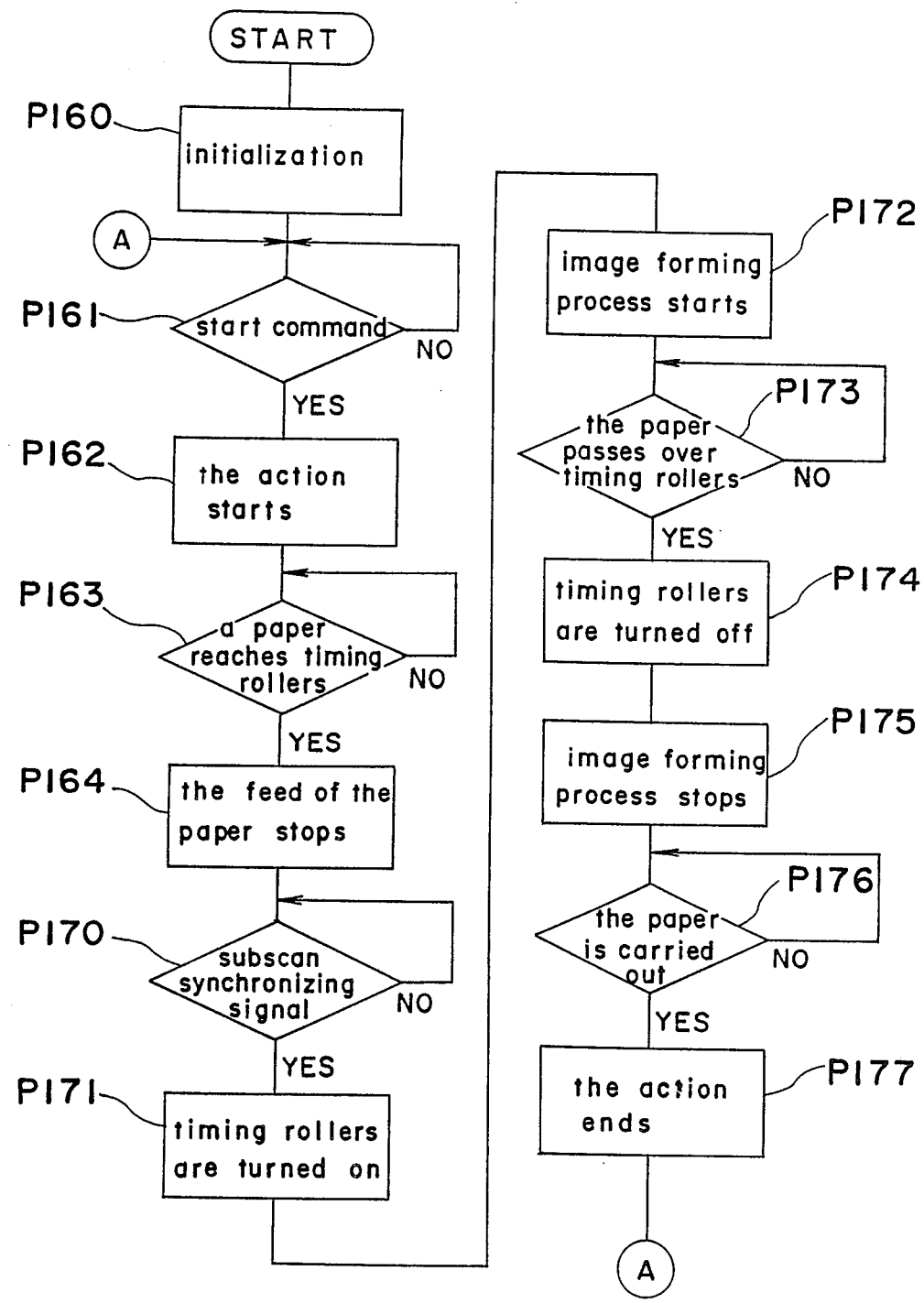
FIG. 11 is a flowchart of the control of the printer.

FIG. 11 shows a flow of the control of the printer 60.

After the electric power source of the printer 60 is turned on the printer 60 is initialized (step P160). When the start command is given at the operational board of the printer 60 (step P161), various kinds of action such as the rotation of the driving motor and the feed of a paper start (step P162). After the paper reaches the timing rollers 91 (step P163), the action of the feed of the paper stops (step P164).

Next, the subscan synchronizing signal is waited to be fed from the reader (step P170). The signal is generated by using the size of the calculated margin of the paper. When the signal is fed, the timing rollers are turned on (step P171) so that the paper is fed to the drum 82, and the image forming process starts (step P172). The timings of the start of the timing rollers 91 and the start of the exposure is controlled so that the top of the paper corresponds to the position of the calculated margin. When the paper passes the timing rollers 91 (step P173), the timing rollers 91 are stopped (step P174). Next, the image forming process stops (step P175). When the paper is send out to the tray 95 (step P176), a series of the reproduction process completes (step P177).

(i) Modified embodiment

In the above-mentioned embodiment of the present invention, a system is composed of an image reader and a printer. On the other hand, another embodiment of the present invention relates to an electrophotographic copier. For example, a platen and a scan system provided in the image reader shown in FIG. 1 is added in the upper side of a printer shown in FIG. 2; further, a print head module 83 is removed and an optical system is provided so that the light from a document on the platen 6 is transmitted to the same position on the photoconductor 81 as the light beams of the head 31. A linear image sensor is provided as a sensor of the density of a document for the automatic control of exposure and the output signal of the sensor is used both for the control of exposure and for the decision of the image area. Then, the timing of the feed of a paper is adjusted according to the position of the obtained image area. Thus, even when a document is placed at any position on the platen, the image on the document can be formed just at the center of the paper.

The present invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embranced therein.

What is claimed is:

1. An image scanning apparatus, comprising:
   a platen on which an original is to be placed;
   a scanning means for scanning the original, which scanning means includes a lens means for projecting an image of the original on an imaging plane and an image sensor means for sensing the image projected on the imaging plane, which image sensor means consists of a plurality of sensor elements arranged linearly relative to the imaging plane;
   an area determining means for determining a real image area from the original on the data sensed by the image sensor means;
   an attributes evaluating means for evaluating attributes of the image processing based on the data sensed by the image sensor means and for setting a threshold value to be used for the image processing; and
   a means for controlling the scanning means on the movement in a preliminary scanning motion and then in an actual scanning motion, wherein when the scanning means is put in the preliminary scanning motion, the area determining means and the attributes evaluating means are activated to determine the real image area, attributes, and the threshold value, and when the scanning means is put in the actual scanning motion, the image data of the original sensed by the image sensor means is outputted according to the actual scanning motion with making reference to the real image area, the attributes, and the threshold value having beeen obtained in the preliminary scanning motion.

2. An image scanning apparatus as claimed in claim 1, wherein one of the attributes is one of a binarization image processing and a dither image processing.

3. An image scanning apparatus as claimed in claim 1, wherein the attributes evaluating means includes a memory means in which evaluated attributes are stored.

4. An image scanning apparatus as claimed in claim 3, wherein the memory means has data storing areas corresponding to blocks which are divided from the image area to be scanned by a predetermined small size, and the attributes evaluating means evaluates attributes of the blocks and makes the attributes store in each data storing area corresponding to a block.

5. An image scanning apparatus as claimed in claim 4, wherein the attributes evaluating means further decides the threshold values for each block and makes each threshold value store in each data storing area together with the attributes of one of the evaluated attributes is the binarization image processing.

6. An image scanning apparatus as claimed in claim 2, wherein the attributes evaluating means includes a dither pattern generating means which generates a variable threshold value if one of evaluated attributes is the dither image processing.

7. An image scanning apparatus as claimed in claim 1, wherein said means for determining the real image area determines the real image area from the positions at which the data of the linearly aligned elements changes from a white level to a black level in directions from an outside to an inside of the original.

8. An image scanning apparatus as claimed in claim 1, wherein said elements of said image sensor means are charge-coupled devices.

9. A recording apparatus comprising:
an image scanning portion including:
a platen on which an original to be scanned is placed;
a scanning means for scanning the original and for projecting the image of the original on an imaging plane;
an image sensor means for sensing the image projected on the imaging plane, which image sensor means consists of a plurality of sensor elements arranged linearly relative to the imaging plane;
a means for determining a real image area on the original based on data sensed by the image sensor means; and
a means for outputting the data sensed by the image sensor means, a scan start signal, and a synchronizing signal, wherein the generation timing of the synchronizing signal is decided based on the real image area; and
an image forming portion including:
a means for forming an image on a photoconductor in accordance with the data of the image;
an image transferring means for transferring the image on the photoconductor to a paper; and
a means for feeding a paper to a predetermined stop position in response to a scan start signal and for transporting the paper from the predetermined stop position to the image transferring means in response to the synchronizing signal;
whereby the image in the actual image area is formed on the center of the paper.

10. The recording apparatus of claim 9 wherein said means for determining the real image area detects an area which is defined as the smallest imaginary rectangle which surrounds an image of characters and figures.

11. The recording apparatus of claim 10 wherein said means for determining the real image area utilizes data from said image sensor means to determine changes between a black level and a white level.

12. The recording apparatus of claim 9 wherein said means for feeding the paper utilizes said synchronizing signal to time a start of timing rollers to feed paper to said image transferring means.

13. An image scanning apparatus, comprising:
a scanning means for scanning an original, which scanning means includes an image sensor means for sensing an image of the original;
an attributes evaluating means for evaluating attributes of image processing based on data sensed by the image sensor means and for setting a threshold value to be used for the image processing; and
a means for controlling the scanning means in a preliminary scanning motion and then in an actual scanning motion, wherein when the scanning means is in the preliminary scanning motion, the attributes evaluating means is activated to determine attributes and a threshold value, and when the scanning means is in the actual scanning motion, the image data of the original sensed by the image sensor means is outputted according to the actual scanning motion with reference to the attributes and the threshold value obtained in the preliminary scanning motion.

14. The image scanning apparatus of claim 13 further including an area determining means for determining a real image area on the original from data sensed by said image sensor means.

15. The image scanning apparatus according to claim 13, wherein the attributes evaluating means includes a memory means wherein the memory means has data storing areas corresponding to blocks which are predetermined portions of said image area, and the attributes evaluating means evaluates attributes of said blocks.

16. A light controller for an image reader, comprising:
a standard pattern plate which has a standard pattern of a prescribed density;
a light source driven by an electric power source of alternating current, illuminating the standard pattern plate and an original;
a photosensor means for detecting the intensity of light illuminated from the light source;
an image sensor means for detecting the light reflected from the standard pattern and the original;
a delay means for delaying the output of the photosensor in correspondence with delay of the output of the image sensor;
an analog-to-digital converter means for transforming an analog output signal of the image sensor means to a digital value;
a memory means for storing the output values of the analog-to-digital converter means;
a level setting means for sending a level voltage synchronously according to the output value of the analog-to-digital converter means synchronously to the output of the image sensor means when the standard pattern plate is illuminated by the light source;

an adder means for adding the output signal of the delay means and the output signal of the level setting means with a predetermined ratio, which adder means providing the sum signal to the input terminal for the reference voltage of the analog-to-digital conversion of the analog-to-digital converter means; and a control means for changing the output signal of the level setting means till the output signal of the analog-to-digital converter means stored in the memory means attains to a predetermined level and of keeping the output signal of the level setting means thereafter when the standard pattern plate is illuminated by the light source.

* * * * *